US009939795B2

(12) United States Patent
Anderson et al.

(10) Patent No.: US 9,939,795 B2
(45) Date of Patent: Apr. 10, 2018

(54) DYNAMIC SIMULATED MOTOR FOR CONTROLLER TESTING

(71) Applicant: TRANE INTERNATIONAL INC., Piscataway, NJ (US)

(72) Inventors: Korwin Jay Anderson, Onalaska, WI (US); Nathan Thomas West, Holmen, WI (US)

(73) Assignee: Trane International Inc., Davidson, NC (US)

( * ) Notice: Subject to any disclaimer, the term of this patent is extended or adjusted under 35 U.S.C. 154(b) by 814 days.

(21) Appl. No.: 14/162,924

(22) Filed: Jan. 24, 2014

(65) Prior Publication Data

US 2014/0222212 A1    Aug. 7, 2014

Related U.S. Application Data

(60) Provisional application No. 61/756,264, filed on Jan. 24, 2013.

(51) Int. Cl.
*G05B 17/02* (2006.01)
*G05B 23/02* (2006.01)

(52) U.S. Cl.
CPC ......... *G05B 17/02* (2013.01); *G05B 23/0205* (2013.01)

(58) Field of Classification Search
CPC .............................. G05B 17/02; G05B 23/0205
See application file for complete search history.

(56) References Cited

U.S. PATENT DOCUMENTS

| | | | |
|---|---|---|---|
| 5,524,498 A | 6/1996 | Thompson et al. | |
| 7,199,549 B2* | 4/2007 | Kleinau | G05B 17/02 318/787 |
| 7,880,460 B2* | 2/2011 | Plude | G05B 17/02 703/14 |
| 8,108,191 B1 | 1/2012 | Britch | |
| 8,249,845 B1 | 8/2012 | Britch et al. | |
| 8,880,250 B2* | 11/2014 | Wu | B60L 15/20 318/767 |
| 9,490,682 B2* | 11/2016 | Borisenko | H02P 29/664 |
| 2009/0085572 A1* | 4/2009 | McGuire | G01R 31/2836 324/500 |
| 2012/0133389 A1 | 5/2012 | Schroeder et al. | |

(Continued)

FOREIGN PATENT DOCUMENTS

WO      2008006116      1/2008

OTHER PUBLICATIONS

Dufour, C., et al. "FPGA-based Ultra-Low Latency HIL Fault Testing of a Permanent Magnet Motor Drive using RT-LAB-XSG" Power Sys. Tech. & IEEE Power India Conf., POWERCON 2008 (2008).*

(Continued)

*Primary Examiner* — Jay Hann
(74) *Attorney, Agent, or Firm* — Taft Stettinius & Hollister LLP (57) ABSTRACT

A controller is configured to generate control signals to control a variable frequency drive coupled with a load. A simulator receives the control signals and processes the control signals. The simulator simulates a variable frequency drive and a load by generating feedback signals based on a model and the control signals. The controller receives the feedback signals from the simulator.

26 Claims, 7 Drawing Sheets

(56) References Cited

U.S. PATENT DOCUMENTS

2012/0191439 A1 7/2012 Meagher et al.
2012/0232869 A1 9/2012 Maturana et al.

OTHER PUBLICATIONS

Dufour, C., et al. "FPGA-Based Real-Time Simulation of Finite-Element Analysis Permanent Magnet Synchronous Machine Drives" Proceedings of 2007 IEEE Power Electronics Specialists Conf., PESC-07, pp. 909-915 (2007).*

Nandi, S., "A Detailed Model of Induction Machines with Saturation Extendable for Fault Analysis" IEEE Transactions on Industry Applications, vol. 40, issue 5, pp. 1302-1309 (2004).*

Munoz, David "Design, Simulation and Implementation of a PMSM Drive System" Masters Thesis, Chalmers U. (2011).*

Lu, B. & Sharma, S. "A Literature Review of IGBT Fault Diagnostic and Protection Methods for Power Inverters" IEEE Transactions on Industry Applications, vol. 45, No. 5, pp. 1770-1777 (2009).*

Gandhi, A., et al. "Recent Advances in Modeling and Online Detection of Stator Interturn Faults in Electrical Motors" IEEE Transactions on Industrial Electronics, vol. 58, No. 5, pp. 1564-1575 (2011).*

Rao, Y., & Chandorkar, M. "Real-Time Electrical Load Emulator Using Optimal Feedback Control Technique" IEEE Transactions on Industrial Electronics, vol. 57, No. 4, pp. 1217-1225 (2010).*

Kestelyn, X., et al. "Easy-to-Implement Integral Numerical Simulation of Multi-Phase Drives Under Fault Supply Condition" Proc. of IEMDC'07, IEEE International Electric Machines & Drives Conf., vol. 2. (2007).*

Schulte, T. & Bracker, J. "Real-Time Simulation of BLDC Motors for Hardware-in-the-Loop Applications Incorporating Sensorless Control" IEEE Int'l Symp. on Industrial Electronics, ISIE (2008) available from <http://www.ieeexplore.ws/document/4677088/>.*

Harakawa, M., et al. "Real-Time Simulation of a PMSM Drive in Faulty Modes with Validation Against an Actual Drive System" IEEE 13th European Conf. on Power Electronics & Applications (2009) available from <http://ieeexplore.ieee.org/document/5278846/>.*

Finney, David, "Computer Simulation of Variable Speed Drives", Institute of Electrical Engineers, 1994, 6 pgs., Savoy Place, London.

Ricci, Francesco et al. "Modeling and simulation of FPGA-based variable-speed drives using simulink", Mathematics and Computers in Simulation, NH Elsevier, 63 (2003), pp. 183-195.

"Simulate Variable Speed Motor Control", available at http://www.mathworks.com/help/physmod/sps/powersys/ug/simulating-variable-speed-motor-control.html?searchHighlight=Simulate%20variable%20speed%20motor%20control, Dec. 3, 2012, 10 pgs.

\* cited by examiner

DYNAMIC SIMULATED MOTOR FOR CONTROLLER TESTING

CROSS-REFERENCE TO RELATED APPLICATIONS

The present application claims the benefit of U.S. Provisional Patent Application No. 61/756,264, filed on Jan. 24, 2013, which is hereby incorporated by reference in its entirety.

BACKGROUND

Variable frequency drives may handle high voltages and high currents in a number of applications including, for example, heating, ventilation, air conditioning, or refrigeration (HVACR) systems. An individual may be seriously injured or other components of or connected to the variable frequency may be damaged during the testing of the control system for the variable frequency drive. There is a need to provide testing and evaluation of the control system of the variable frequency drive. Existing approaches suffer from various shortcomings relative to these and other needs such as the need for cumbersome and expensive equipment, computational complexity and inefficiency, failsafe shortcomings, inability to simulate various modes of operation and/or failure modes and others. There remains a need for the unique and inventive apparatuses, methods and systems disclosed herein.

SUMMARY

An exemplary embodiment includes a simulator that simulates operation of a variable frequency drive coupled with a load. The simulator receives control signals from a control unit being tested, such as a microprocessor-based controller. The simulator processes the control signals and transmits feedback signals to the control unit. Other embodiments include apparatuses, systems, devices, hardware, methods, and combinations for a simulator that simulate a variable frequency drive and a load and provide an interface for receiving drive control signals from a device under test and providing feedback signals to the device under test. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF EXEMPLARY EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
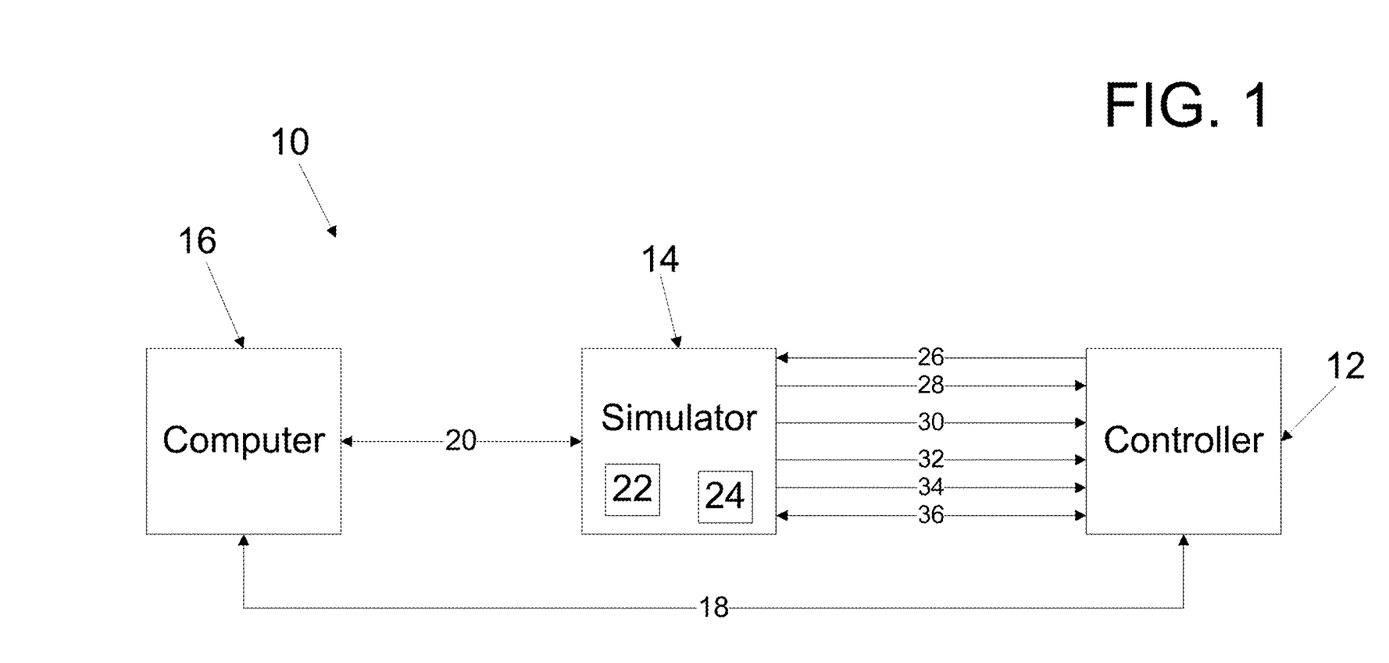
FIG. 1 is schematic block diagram of an exemplary simulation system.

FIG. 1 illustrates a system 10 for testing a controller 12. The controller 12 is configured to control a variable frequency drive and a load. The load may be an inductive load, an induction motor, and/or a permanent magnet motor. In addition, the motor simulated may be designed to drive a chiller that is part of a heating, ventilating, air-conditioning, or refrigeration (HVACR) system. The system 10 includes a simulator 14, which simulates the operation of a variable frequency drive and a load. This allows the controller 12 to be tested without connecting the controller 12 to an actual variable frequency drive and motor.

The system 10 also includes a computer 16 to control and monitor the testing of the controller 12. The computer 16 communicates with the controller 12 over a bus 18, which may be implemented using an inter-module communication protocol. The computer 16 may send commands to the controller 12. For example, the computer 16 may instruct the controller 12 when to turn on or turn off, which mode to operate in, and/or use certain parameters during operation, among other commands. The controller 12 may also report status information to the computer 16. The status information may include data about the testing and operation of the controller 12.

The computer 16 communicates with the simulator 14 over a bus 20. In one embodiment, the bus 20 is implemented using a modbus communication protocol. The computer 16 may select a particular load model and/or simulation mode 22 for the simulator 14 to utilize. Furthermore, the load model 22 may be stored on the computer 16 and then sent to the simulator 14 or the simulator 14 may store one or more load models and the computer 16 selects the particular one for use. The computer 16 may also send parameters 24 to the simulator 14, which may be stored in a parameter table. The parameters 24 are used by the simulator to simulate a variable frequency drive and load. The simulator 14 also sends status information to the computer 16 using the bus 20. The status information may include data about the simulation and testing of the controller 12. The computer 16 also may have an interface that allows a user to select and issue commands and/or parameters.

The controller 12 transmits one or more control signals 26 to the simulator 14. The control signals 26 are configured to control a variable frequency drive and a load such as a motor. In addition, the control signals 26 may be configured to provide a pulse width modulated (PWM) signal at an inverter output, for example, by providing switch control signals which are voltage boosted and provided to control switching devices operating in concert to generate the PWM signal. For simplicity of description, such control signals will be referred to herein as PWM control signals. The simulator 14 processes the control signals 26 and uses them with the selected model 22 and/or parameters 24 to simulate operation of a variable frequency drive and a load to generate one or more feedback signals. Moreover, the simulator 14 may simulate one or more of the following components of the variable frequency drive including a rectifier, a DC voltage bus, an inverter, a gate drive module, fault sensors, current sensors, voltage sensors, temperature sensors, and the like.

The simulator 14 may process the control signals 26, including a PWM control signal, to determine one or more simulated inverter output voltages 28 based on the control signals 26, the model 22, and/or parameters 24. The simulated inverter output voltages 28 may be sent to the controller 12 as feedback signals.

The simulator 14 may then use the selected load model 22 and the simulated inverter output voltages 28 to determine one or more simulated output currents 30. The parameters 24 may also be used in determining the simulated output currents 30. These output currents would typically be measured by current sensors at an output of the inverter of the variable frequency drive such as at a load or motor terminal. For example, the simulated output currents 30 may represent the current at a motor terminal for each phase, multiple phases, or all of the phases of the variable frequency drive. The simulated output currents 30 may also be provided to the controller 12 as feedback signals.

The simulator 14 is also configured to simulate a DC voltage bus of a variable frequency drive by determining one or more simulated DC bus voltages 32 based on the control signals 26, the model 22, and/or parameters 24. As one example, a DC voltage bus may include a positive DC voltage rail and a negative DC voltage rail. Thus, the simulated DC bus voltages 32 may include a simulated positive DC rail voltage and/or a simulated negative DC rail voltage. It shall be understood that the terms positive and negative in this context are relative and that the actual polarities may be both positive, both negative, positive and negative, positive and zero, or negative and zero in various embodiments. The simulated DC bus voltages 32 may also be provided to the controller 12 as feedback signals.

The simulator 14 is also configured to simulate one or more temperature sensors by determining one or more simulated temperature readings 34 of a variable frequency drive based on the control signals 26, the model 22, and/or parameters 24. For example, the simulator 14 may determine a simulated temperature or a simulated temperature reading for one or more of the following locations in the variable frequency drive: at the transistors at the output of each phase of the inverter, at a heat sink for the inverter, and at a heat sink for the rectifier. Other locations on a variable frequency drive or motor for generating simulated temperature readings are contemplated. The simulated temperature readings 34 may also be provided to the controller 12 as feedback signals.

The simulator 14 is also configured to generate simulated fault conditions 36. The simulated fault conditions 36 may be based on the control signals 26, model 22, and/or parameters 24. For example, the simulator 14 may determine that the control signals 26 are causing a fault condition 36 such as a desaturation of a transistor that is part of the inverter of a variable frequency drive. Another example of a fault condition 36 is setting a simulated voltage or simulated current high or low. Another example of a fault condition is adjusting the flux scaling. Other examples include a fault in the communication bus, such as ASCII bus, between the simulator 14 and the controller 12. Other examples of faults related to the motor include a current/ground fault and a current/missing phase. Other examples of faults related to the variable frequency drive include current, voltage, measured ambient temperature, transistor drive desaturation detection, system/safety interaction, measured heat sink temperature, and bus voltage. Other fault conditions 36 are also contemplated.

The simulator 14 may also generate a simulated fault condition 36 based on the model 22 and/or parameters 24. In this way, the computer 16 may initiate a particular fault condition 36 to determine whether the controller 12 can correctly identify the fault condition 36 and adjust the control signals 26 correctly in response to the identified fault condition 36. The simulated fault condition 36 may also be provided to the controller 12 as feedback signals. In one embodiment, the simulator 14 provides the simulated fault conditions 36 to the controller 12 regularly. However, it is also contemplated that the controller 12 may poll the simulator 14 for fault data and the simulator 14 responds to the poll with the simulated fault conditions 36.

Although the various feedback signals, such as simulated inverter output voltages 28, simulated output currents 30, simulated DC bus voltages 32, simulated temperature readings 34, and simulated fault conditions 36 are shown as separate feedback lines, these feedback signals may be provided to the controller 12 together or separately or a combination thereof. For example, some of the simulated data or feedback signals may be provided to the controller 12 in a digital format such as ASCII, while other simulated data or feedback signals are provided to the controller 12 in an analog format.

Figure 2:
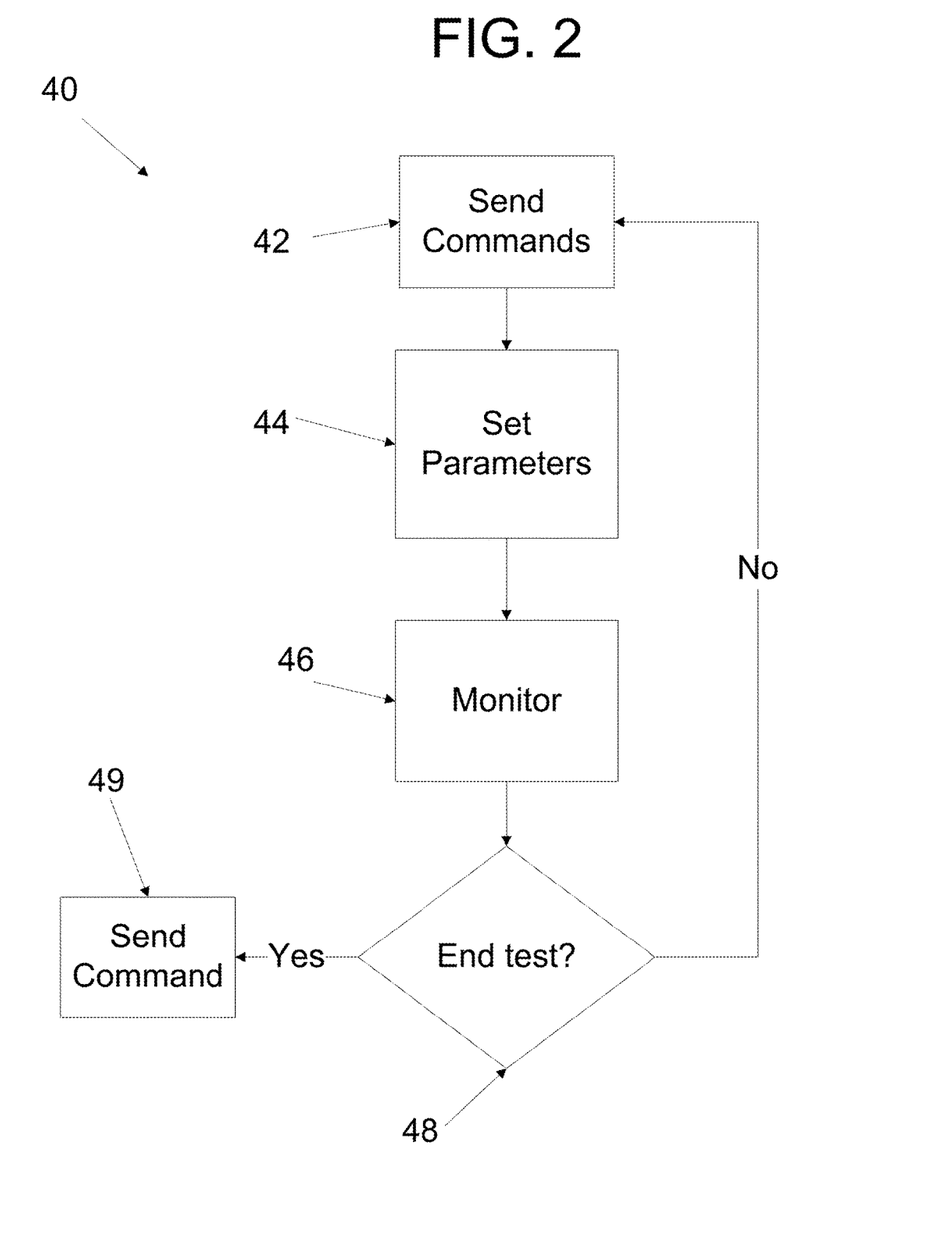
FIG. 2 is schematic flow diagram of an exemplary process for controlling and monitoring the testing of a controller.

FIG. 2 illustrates a process 40 that may be implemented by the computer 16 to control and monitor the operation of the simulator 14 and the controller 12. Operations illustrated for all of the processes in the present application are understood to be examples only, and operations may be combined or divided, and added or removed, as well as re-ordered in whole or in part, unless explicitly stated to the contrary.

Process 40 begins with operation 42 in which the computer 16 determines and sends commands to the controller 12 and/or the simulator 14. For example, the computer 16 may instruct the controller 12 and/or the simulator 14 to power on, begin operation, and/or start a testing sequence. Other commands in addition to or in place of those described are contemplated.

Process 40 proceeds from operation 42 to operation 44. At operation 44, the computer 16 sets various parameters in the controller 12 and/or the simulator 14. For example, the computer 16 may select a load model 22 to be used by the simulator 14. The computer 16 may also initiate simulated fault conditions 36 and/or set certain parameters that would cause a simulated fault condition 36 to be generated by the simulator 14. In addition the computer 16 may set parameters in the controller 12 that are used by the controller 12 in generating the control signals 26. Other parameters in addition to or in place of those described are contemplated.

Process 40 proceeds from operation 44 to operation 46. At operation 46, the computer 16 receives status information regarding the operation of the controller 12 and/or the simulator 14. For example, the controller 12 may report to the computer 16 whether the controller 12 has identified any simulated fault conditions 36 and how the controller 12 corrected the control signals 26 in response to the identified fault conditions 36. As another example, the simulator 14 may report to the computer 16 various simulated data generated that is included in the feedback signals. This would allow a user of the computer 16 to determine whether controller 12 is generating the correct control signals 26 to control a variable frequency drive and motor appropriately. Other status information in addition to or in place of those described are contemplated.

Process 40 then proceeds to operation 48 in which it is determined whether testing should end. If testing should end, process 40 proceeds to operation 49 in which shutdown or exit commands are sent to the controller 12 and/or the simulator 14. If testing should not end, then process 40 proceeds back to operation 42 where a new set of test commands may be issued. It is contemplated that a user of the computer 16 may use a computer interface to select and send commands and/or parameters to the controller 12 and/or simulator 14.

Figure 3:
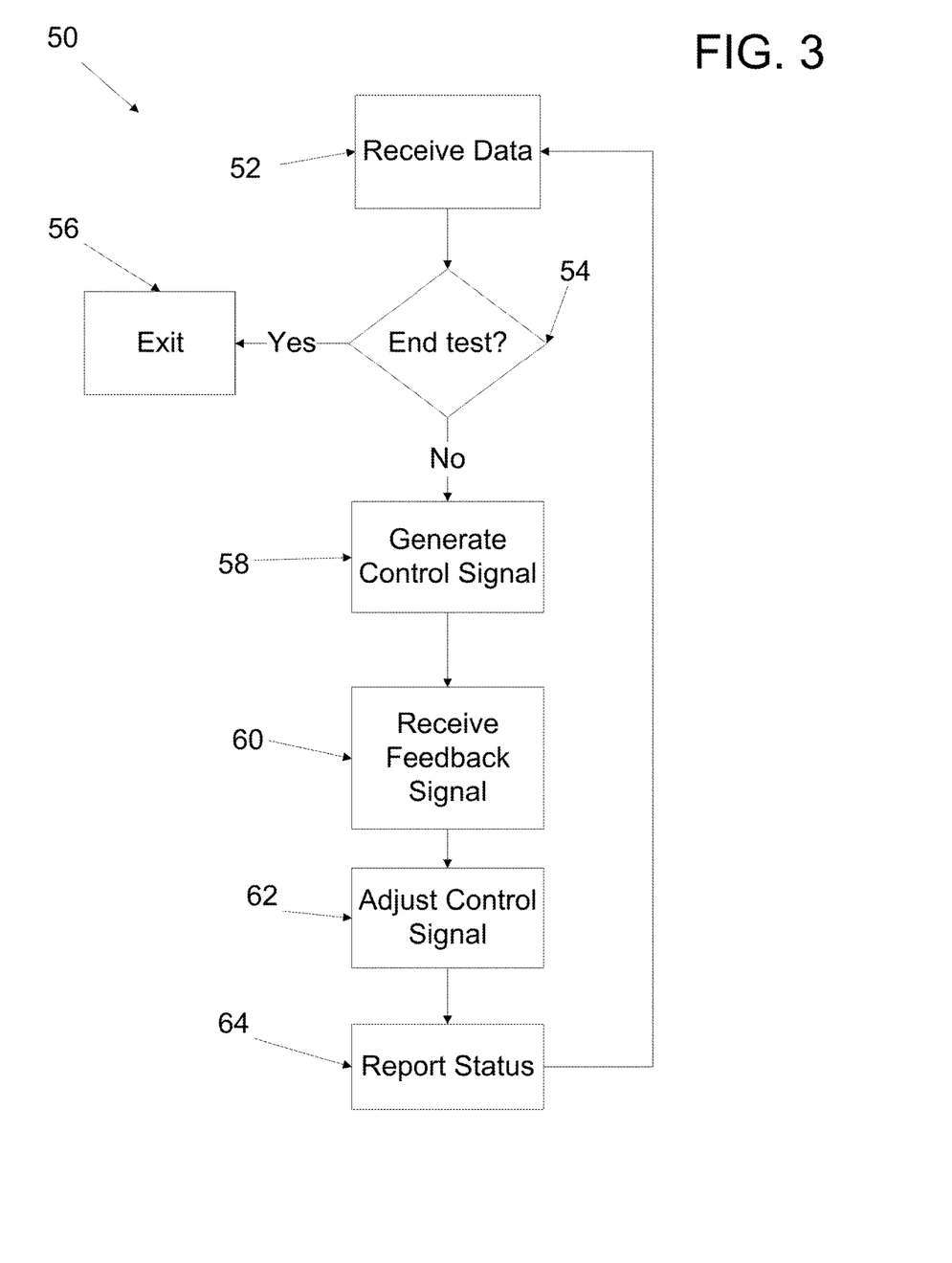
FIG. 3 is schematic flow diagram of an exemplary process for controlling a variable frequency drive operatively coupled with a load.

FIG. 3 illustrates a process 50 that may be implemented by the controller 12 for controlling a variable frequency drive and a load such as a motor. At operation 52, the controller 12 receives one or more commands from the computer 16. The commands may instruct the controller 12 how to carry out a particular test sequence or execute a mode of operation. For example, one example of a test sequence may be powering the motor at full capacity for a period of time and then powering the motor at partial capacity over another period of time. The commands may also include a power on or shut down command. Other commands in addition to or in place of those described are contemplated.

Process 50 then proceeds from operation 52 to operation 54. At operation 54, the controller 12 determines whether the command is a shutdown or an end test command. If the command is a shutdown or an end test command, then process 50 proceeds to operation 56 in which the controller 12 exits from testing. Otherwise, process 50 proceeds to operation 58.

At operation 58, the controller 12 generates the control signals 26, which may include a PWM control signal. The control signals 26 may be tailored to the specific variable frequency drive and/or motor hardware that the controller 12 believes that it is controlling. For example, the commands and parameters received from the computer 16 may indicate the particular hardware of the variable frequency drive and/or motor to be driven, which allows the controller 12 to tailor the control signals 26 for that hardware. As another example, the commands and/or parameters may establish a test sequence or mode of operation to be executed by the controller 12. For example, the commands and/or parameters may establish a period of time that controller 16 should operate, whether to power the variable frequency drive and motor fully or partially, and the like.

Process 50 then proceeds to operation 60 in which the controller 12 receives feedback signals from the simulator 14. The controller 12 processes the feedback signals to determine whether the control signals 26 are producing the correct voltages and currents in the variable frequency drive and motor and whether any fault conditions 36 exist. If the controller determines that the voltages, currents, and/or temperature readings are not at approximately the target values or if there is a fault condition, the controller 12 will adjust the control signals 26 to correct the issue.

Process 50 then proceeds from operation 62 to operation 64 in which the controller 12 reports status information to the computer 16. The status information may include any information about the operation of the controller 12 including information about the control signals 26, information about any of the simulated data received in the feedback signals, and/or any information that indicates a fault condition. Process 50 then proceeds from operation 64 back to operation 52 in which controller 12 receives data such as a command from the computer 16.

Figure 4:
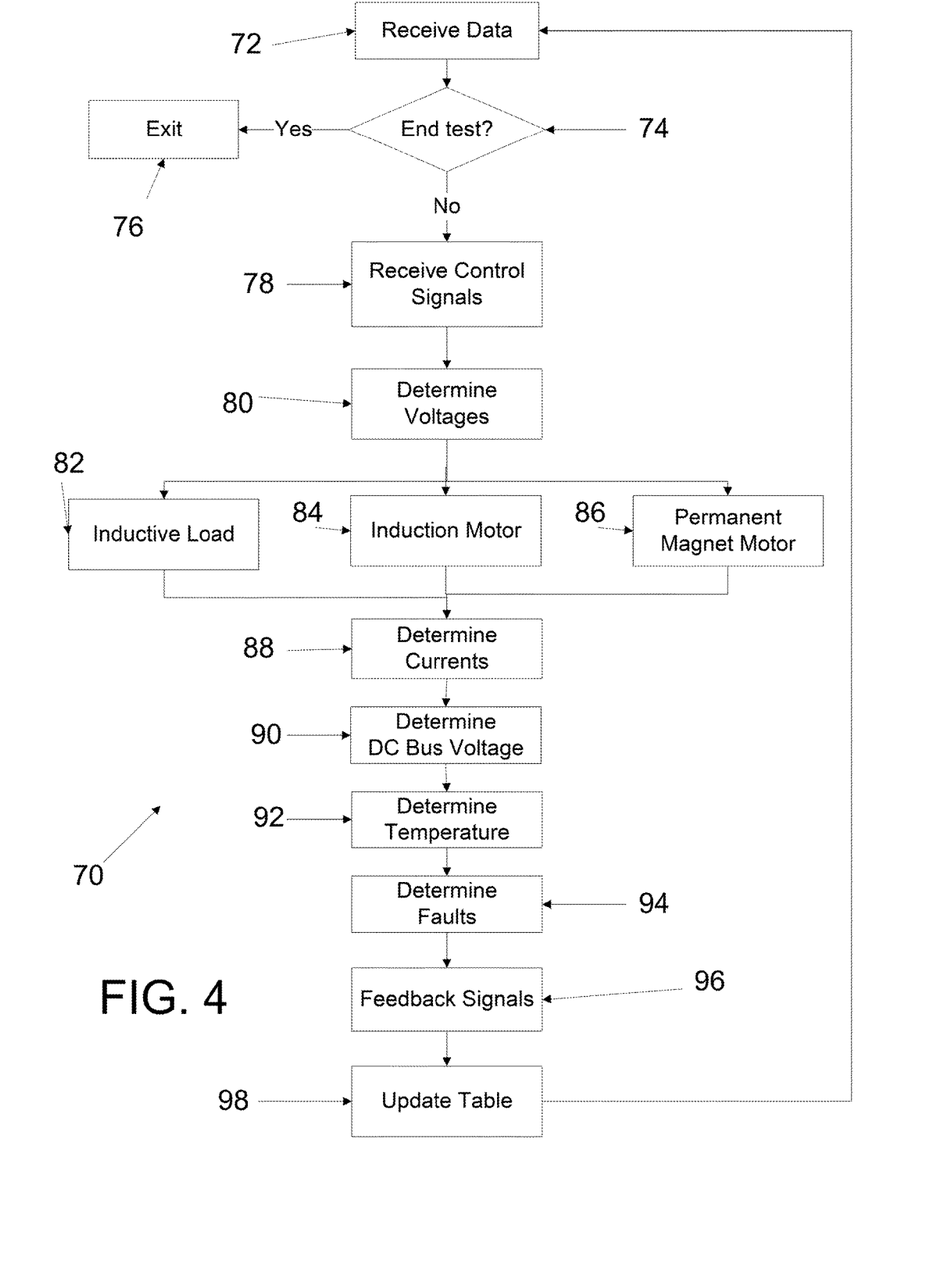
FIG. 4 is a schematic flow diagram of an exemplary process for simulating a variable frequency drive operatively coupled with a load.

FIG. 4 illustrates a schematic flow diagram of a process 70 that may be implemented by the simulator 14 for simulating a variable frequency drive and a load such as a motor or an inductive test load. Process 70 begins with operation 72 in which the simulator 14 receives data in the form of commands and/or parameters from the computer 16. As discussed above, the commands and/or parameters from the computer 16 relates to the particular type of variable frequency drive and/or load that the simulator 14 will simulate as well as any fault conditions that are to be simulated. For example, the computer 16 may select a particular type of load to be simulated such as an inductive load, an induction motor, and/or a permanent magnet motor.

Process 70 proceeds from operation 72 to operation 74 in which it is determined whether the command is to exit the testing or shutdown the simulator 14. If the received command is a shutdown or exit command, then process 70 proceeds to operation 72 in which the testing is exited and/or the simulator 14 a shutdown. If the command is not a shutdown or exit command, then process 70 proceeds to operation 78.

At operation 78, the simulator 14 receives the control signals 26 from the controller 12. The control signals 26 include a PWM control signal, which is used by the switching devices, e.g., transistors, of the inverter to generate the output voltage and output current to power the load such as a motor.

Process 70 then proceeds from operation 78 to operation 80. In operation 80, the simulator 14 simulates the inverter of a variable frequency drive by determining one or more simulated inverter output voltages 28 based on the control signals 26, the model 22, and/or parameters 24. The simulator 14 may determine a simulated inverter output voltage 28 for some or all of the phases of the variable frequency drive being simulated. In addition, at operation 80, the simulator 14 may also increment a voltage counter that may be part of a parameters table. The voltage counter may be used by the simulator 14 for performing various voltage and/or current calculations.

Process 70 then proceeds from operation 80 to one of operations 82, 84, or 86, which relate to the various load models 22 that may be used by simulator 14. The simulator 14 will use the load model 22 selected by the computer 16. As shown in FIG. 4, there are three load models: an inductive load, an induction motor, or a permanent magnet motor. It is contemplated that other loads and models may be used with the present application other than the three shown in FIG. 4.

Figure 5:
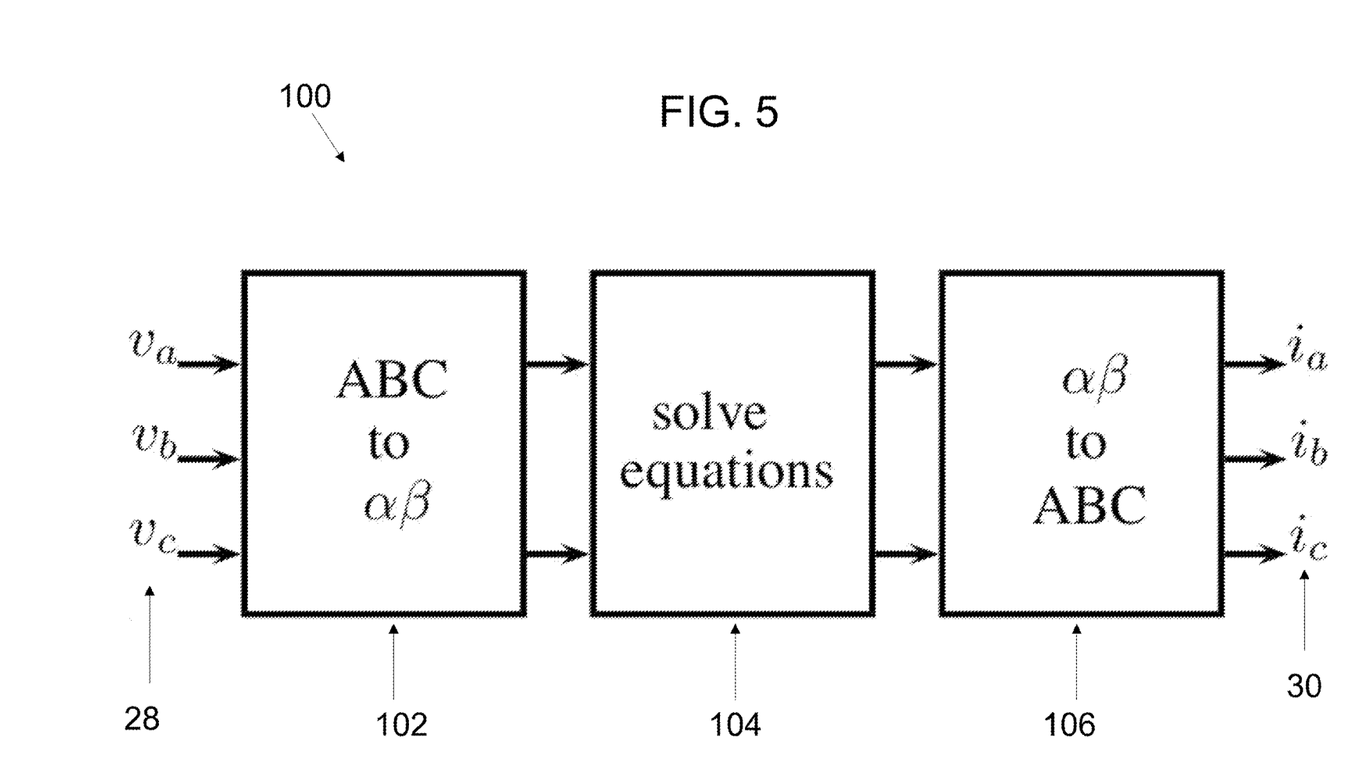
FIG. 5 is a schematic flow diagram of an exemplary process for determining currents based on an inductive load model.
Figure 6:
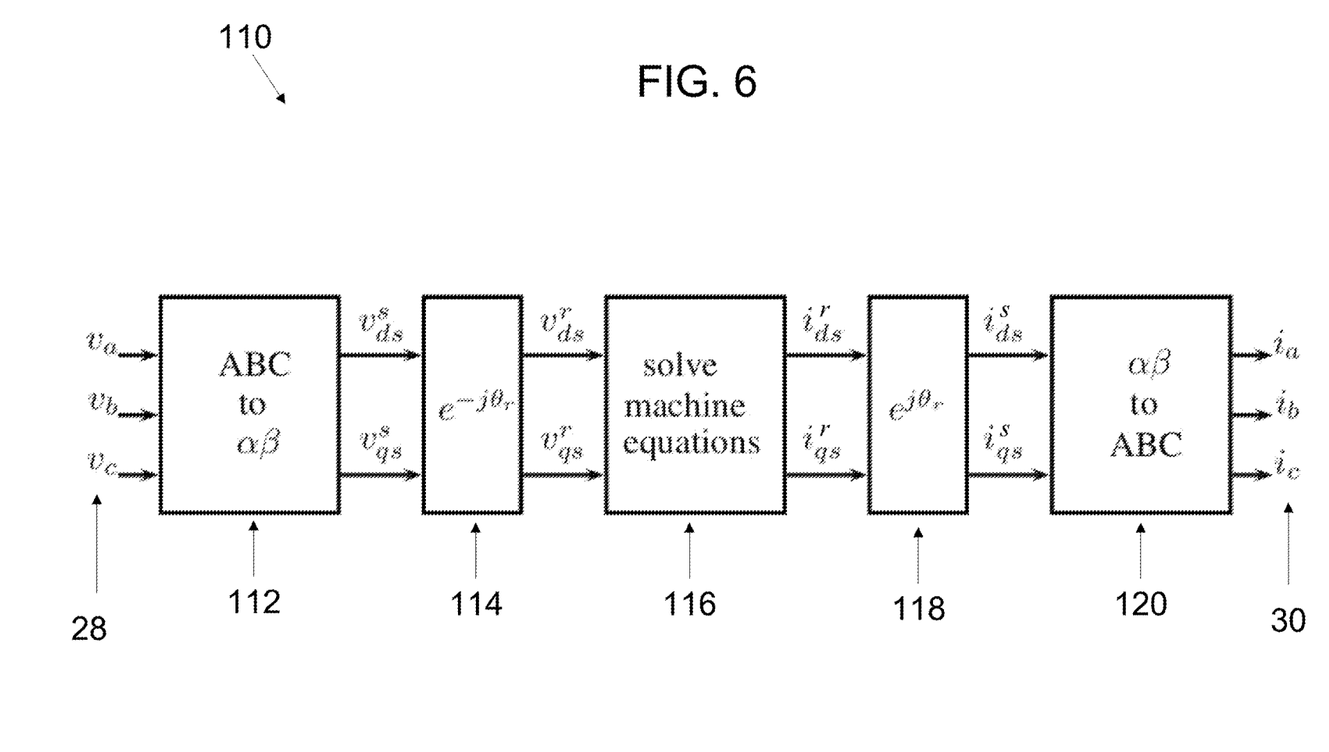
FIG. 6 is a schematic flow diagram of an exemplary process for determining currents based on an induction motor.

Process 70 then proceeds to operation 88 in which the simulated output currents 30 are determined based on the control signals 26, the model 22, parameters 24 and/or the simulated inverter output voltages 28. FIGS. 5 and 6 and their accompanying description will describe the process for calculating the simulated output currents 30 in more detail.

Process 70 then proceeds to operation 90 in which the simulator 14 determines the simulated DC bus voltages 32 based on the control signals 26, the model 22, and/or parameters 24. Furthermore, the simulator 14 may determine a positive DC rail voltage and a negative DC rail voltage.

Process 70 then proceeds from operation 90 to operation 92 in which the simulator 14 determines one or more simulated temperature readings based on the control signals 26, the model 22, and/or parameters 24. The locations of the simulated temperature readings 34 may include at the transistors at the output of each phase of the inverter, at a heat sink for the inverter, and heat sink for the rectifier.

Process 70 then proceeds from operation 92 to operation 94 in which the simulator 14 generates simulated fault conditions 36 based on the control signals 26, the model 22, and/or parameters 24. One example of a fault condition is a desaturation of a transistor of the inverter being simulated. Other examples of faults include setting simulated voltages, simulated currents, and/or simulated temperature readings high or low, which may indicate a fault condition or failure to the controller 12. Other fault conditions in addition to or in place of those discussed are also contemplated.

Process 70 then proceeds from operation 94 to operation 96 in which the simulator 14 generates one or more feedback signals based on the simulated inverter output voltages 28, the simulated output currents 30, the simulated DC bus voltages 32, the simulated temperature readings 34, and the simulated fault conditions 36. The feedback signals are then provided by the simulator 14 to the controller 12.

Process 70 then proceeds from operation 96 to operation 98 in which simulator 14 updates its parameter tables based on data received from the computer 16, the control signals 26 from the controller 12, and/or based on the simulated data calculated such as the simulated inverter output voltages 28, the simulated output currents 30, the simulated DC bus voltages 32, the simulated temperature readings 34, and the simulated fault conditions 36. Process 70 then proceeds from operation 98 back to operation 72 and operation 74 in which the simulator 14 determines whether to exit testing or to continue.

FIG. 5 illustrates a schematic flow diagram of a process 100 that may be implemented by the simulator 14 for determining the simulated output currents 30 according to an inductive load model as shown at operation 82 in FIG. 4. Process 100 begins at operation 102 in which the simulated inverter output voltages 28 are inputted and transformed from a three coordinate system ABC to a two coordinate system αβ. This transformation may be performed to simplify the calculations to determine the simulated output currents. It is contemplated that although a three-phase system is shown, other systems with a different number of phases may be used with the present application.

Process 100 then proceeds from operation 102 to operation 104. At operation 104, the simulator 14 solves the following equations to determine the currents where L is inductance, v is voltage, and i is current, and the subscripts a, b, c refer to the three phases:

$$L\frac{d}{dt}i_a = v_a - ri_a \quad (1)$$

$$L\frac{d}{dt}i_b = v_b - ri_b$$

$$L\frac{d}{dt}i_c = v_c - ri_c$$

After the equations are solved, process 100 then proceeds from operation 104 to operation 106. In operation 106, the data is transformed from a two coordinate system αβ to a three coordinate system ABC. The outputs of operation 106 are the simulated output currents 30.

FIG. 6 illustrates a schematic flow diagram of a process 110 that may be implemented by the simulator 14 for determining the simulated output currents 30 according to an induction motor model as shown at operation 84 in FIG. 4. Process 110 begins at operation 112 in which the simulated inverter output voltages 28 are inputted and transformed from a three coordinate system ABC to a two coordinate system αβ. This transformation may be performed to simplify the calculations to determine the simulated output currents 30. It is contemplated that although a three-phase system is shown, other systems with a different number of phases may be used with the present application.

Process 110 then proceeds from operation 112 to operation 114. At operation 114, the simulator 14 converts the voltages from a stator frame of reference to a rotor frame of reference. Process 110 then proceeds from operation 114 to operation 116, which solves the following equations to determine the currents where L is inductance, v is voltage, i is current, ψ is flux, $r_s$ is linkage, $\omega_b$ is rated frequency (rad/sec), $Z_b$ is 100% (normalized) impedance, $C_i$ is a factor to allow 1.0 to represent an overcurrent condition, $C_w$ is a factor to allow 1.0 to represent an overspeed condition M is normalized rotational inertia (units of seconds), and $\sigma L_s$ is an induction motor parameter:

$$\frac{\sigma L_s}{Z_b}\frac{d}{dt}i^r_{ds} = v^r_{ds} - r'_s i^r_{ds} + \frac{\omega_r}{\omega_b}\left(L_s - \frac{L_m^2}{L_r}\right)i^r_{qs} + \frac{L_m}{L_r}\frac{r_r}{L_r}\psi^r_{dr} + \frac{L_m}{L_r}\frac{\omega_r}{\omega_b}\psi^r_{qr} \quad (2)$$

$$\frac{\sigma L_s}{Z_b}\frac{d}{dt}i^r_{qs} = v^r_{qs} - r'_s i^r_{qs} - \frac{\omega_r}{\omega_b}\left(L_s - \frac{L_m^2}{L_r}\right)i^r_{ds} - \frac{L_m}{L_r}\frac{\omega_r}{\omega_b}\psi^r_{dr} + \frac{L_m}{L_r}\frac{r_r}{L_r}\psi^r_{qr}$$

$$\frac{1}{\omega_b}\frac{d}{dt}\psi^r_{dr} = \frac{L_m}{L_r}r_r i^r_{ds} - \frac{r_r}{L_r}\psi^r_{dr}$$

$$\frac{1}{\omega_b}\frac{d}{dt}\psi^r_{qr} = \frac{L_m}{L_r}r_r i^r_{qs} - \frac{r_r}{L_r}\psi^r_{qr}$$

$$C_i\frac{\sigma L_s}{Z_b}\frac{d}{dt}i^r_{ds} = \quad (3)$$

$$v^r_{ds} - C_i r'_s i^r_{ds} + C_\omega C_i\frac{\omega_r}{\omega_b}\left(L_s - \frac{L_m^2}{L_r}\right)i^r_{qs} + \frac{x_m}{x_r}\frac{r_r}{x_r}\psi^r_{dr} + C_\omega\frac{x_m}{x_r}\frac{\omega_r}{\omega_b}\psi^r_{qr}$$

$$C_i\frac{\sigma L_s}{Z_b}\frac{d}{dt}i^r_{qs} = v^r_{qs} - C_i r'_s i^r_{qs} -$$

$$C_\omega C_i\frac{\omega_r}{\omega_b}\left(L_s - \frac{L_m^2}{L_r}\right)i^r_{ds} - \frac{x_m}{x_r}\frac{\omega_r}{\omega_b}\psi^r_{dr} + C_\omega\frac{x_m}{x_r}\frac{r_r}{x_r}\psi^r_{qr}$$

$$\frac{1}{\omega_b}\frac{d}{dt}\psi^r_{dr} = C_i\frac{x_m}{x_r}r_r i^r_{ds} - \frac{r_r}{L_r}\psi^r_{dr}$$

$$\frac{1}{\omega_b}\frac{d}{dt}\psi^r_{qr} = C_i\frac{L_m}{L_r}r_r i^r_{qs} - \frac{r_r}{L_r}\psi^r_{qr}$$

$$M\frac{d}{dt}\frac{\omega_r}{\omega_b}\psi^r_{qr} = \frac{C_i}{C_\omega}\frac{x_m}{x_r}(\psi_{dr}i_{qs} - \psi_{qr}i_{ds}) - \frac{1}{C_\omega}T_{load}$$

Process 110 then proceeds from operation 116 to operation 118. At operation 118, the simulator 14 converts the system from a rotor frame of reference to a stator frame of reference. Process 110 then proceeds to operation 120 in which the data is transformed from a two coordinate system αβ to a three coordinate system ABC. The outputs of operation 110 are the simulated output currents 30.

The process for determining the simulated output currents 30 in which a permanent magnet motor model is used is similar to the process 110 where an induction motor model is used. Moreover, the equations to be solved for a permanent magnet motor would been those known to persons of ordinary skill in the art.

Figure 7:
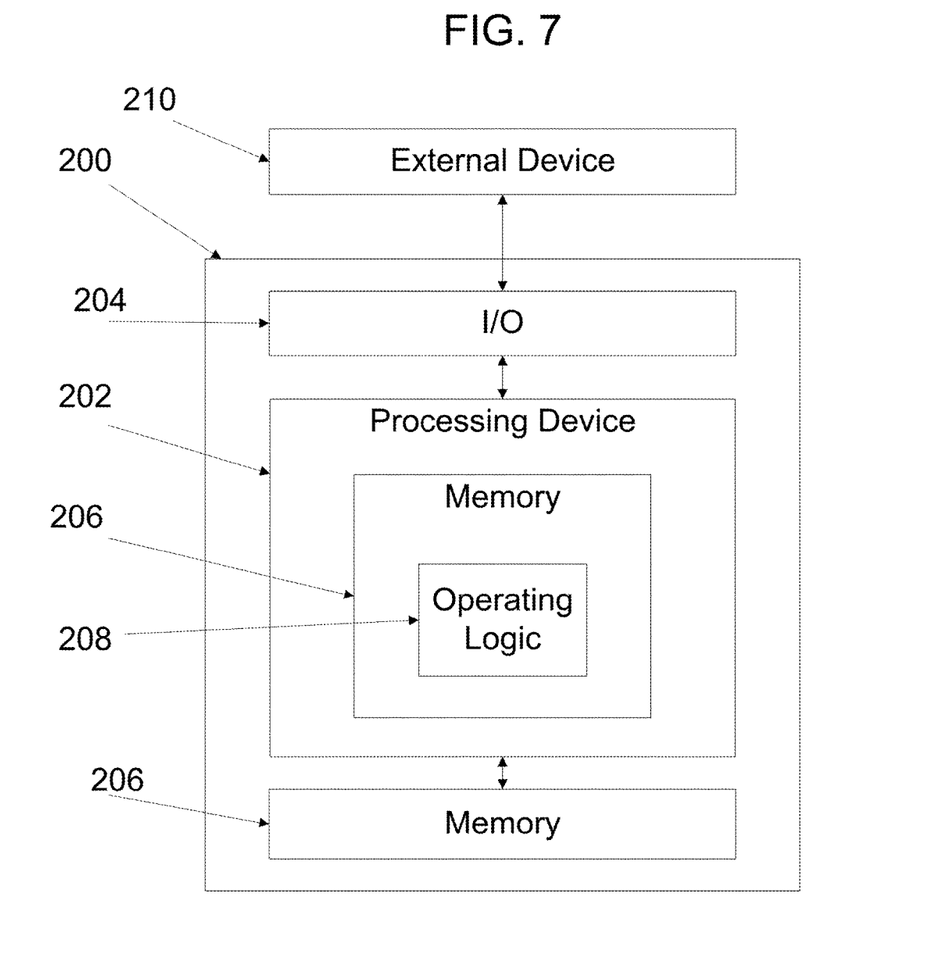
FIG. 7 is a schematic block diagram of an exemplary computing device.

FIG. 7 is a schematic block diagram of a computing device 200. The computing device 200 is one example of a controller, simulator, and/or computer configuration which may be utilized in connection with the controller 12, simulator 14, and/or computer 16 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a network adapter, network card, interface, or a port (e.g., a USB port, serial port, parallel port, an analog port, a digital port, a modbus interface, an ASCII interface, VGA, DVI, HDMI, FireWire, CAT 5, or any other type of port or interface). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computing device 200. For example, the external device 210 may be a handheld computer or diagnostic tool, a controller, a simulator, a computer, a server, a printer, a display, an alarm, an illuminated indicator such as status indicator 152, a keyboard, a mouse, or a touch screen display. Furthermore, it is contemplated that the external device 210 may be integrated into the computing device 200. It is further contemplated that there may be more than one external device in communication with the computing device 200.

Processing device 202 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 7, memory 206 may be included with processing device 202 and/or coupled to the processing device 202.

The processes 40, 50, 70, 100, and 110 may be implemented in operating logic 208 as operations by software, hardware, artificial intelligence, fuzzy logic, or any combination thereof, or at least partially performed by a user or operator. In certain embodiments, modules represent software elements as a computer program encoded on a computer readable medium, wherein the controller 12, simulator 14, and/or computer 16 performs the described operations when executing the computer program.

The present application refers to some voltages, currents, and/or readings as being determined "approximately." As used herein, "approximately" is to generally account for the error or impreciseness of measuring a voltage or current or they may change over small amounts of time. The number of volts or amps that are acceptable under "approximately" depends on the system. In some systems, less than one volt or one amp may be acceptable, but in other systems, several volts or several amps will be within "approximately." In addition, even if a comparison or evaluation does not refer to "approximately," the present application presumes that there is an accounting for the impreciseness in the system.

While the invention has been described in connection with what is presently considered to be the preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
a microprocessor-based controller configured to output variable frequency drive (VFD) control signals and receive VFD feedback signals;
a simulator unit including a processing device, a memory device structured to store a set of instructions, and an input/output device structured configured to receive the VFD control signals from the controller and output the VFD feedback signals to the controller; and
a computer configured to communicate simulation parameters to the simulator unit and operation commands to the controller;
wherein the simulator unit is configured to execute the set of instructions with the processing device so as to simulate operation of a variable frequency drive operatively coupled to a load, including:
processing the VFD control signals to determine one or more simulated inverter output voltages;
processing the simulated inverter output voltages using a load model to determine one or more simulated inverter output currents;
processing the simulated inverter output voltages and the simulated inverter output currents to determine the VFD feedback signals; and
providing the VFD feedback signals to the controller;
wherein the simulator unit is further configured to process the simulation parameters and the VFD control signals to simulate a DC bus voltage of the variable frequency drive and the VFD feedback signals include the simulated DC bus voltage.

2. The apparatus of claim 1, wherein the simulator unit is further configured to process the simulation parameters to simulate a desaturation condition of a transistor of an inverter of the VFD, wherein the VFD feedback signals include an indication of the simulated desaturation condition.

3. The apparatus of claim 1, wherein the simulator unit is further configured to process the simulation parameters and the VFD control signals simulate temperature readings at a plurality of nodes, wherein the nodes include an inverter heat sink, a rectifier heat sink, and a transistor of an inverter of the variable frequency drive, wherein the VFD feedback signals include the simulated temperatures readings.

4. The apparatus of claim 1, wherein the simulator unit is further configured to process the simulation parameters to simulate a fault condition of the variable frequency and the VFD feedback signals include simulated fault data.

5. The apparatus of claim 4, wherein the controller is further configured to identify the fault condition based on an analysis of the VFD feedback signals, and wherein the controller is further configured to adjust the VFD control signals in response to the identified fault condition.

6. The apparatus of claim 1, wherein the load model includes an inductive test load, an induction motor, and a permanent magnet motor.

7. The apparatus of claim 1, wherein the computer is configured to allow selection of the load model.

8. The apparatus of claim 1, wherein the simulator unit is further configured to process the simulation parameters to simulate one of a desaturation condition of a transistor of an inverter of the VFD; temperature readings at a plurality of nodes; and a DC bus voltage of the variable frequency drive.

9. A method, comprising:
generating, with a control unit, control signals configured to control a variable frequency drive;
simulating operation of the variable frequency drive and the load with a simulator;
receiving, at the simulator, the control signals from the control unit;
determining simulated inverter output voltages based on the control signals;
determining simulated output currents based on a simulation mode that uses the simulated inverter output voltages;
generating simulated operational data that includes the simulated inverter output voltages and the simulated output current;
providing the simulated operational data to the control unit; and
controlling operation of the simulator and the control unit with a computer configured to provide simulation parameters to the control unit and provide output commands to the control unit;
processing the simulation parameters and the control signals to simulate a DC bus voltage of the variable frequency drive and the simulated operational data include a simulated DC bus voltage.

10. The method of claim 9, further comprising:
receiving, with the control unit, the simulated operational data; and
generating, with the control unit, new control signals based on processing of the simulated operation data.

11. The method of claim 9, further comprising:
selecting the simulation mode from a plurality of simulation modes including at least one of an inductive load, an induction motor, and a permanent magnet motor.

12. The method of claim 9, further comprising:
directing the simulator to simulate a fault condition; and
monitoring the control unit to determine whether the control unit identified the fault condition and adjusted its operation based on the fault condition.

13. The method of claim 12, wherein the fault condition is a simulated desaturation condition at a transistor of an inverter of the variable frequency drive.

14. The method of claim 9, further comprising:
determining at least one of a simulated temperature and a simulated DC bus voltage of the variable frequency drive based on the simulation mode and the control signals.

15. A system, comprising:
a controller configured to output control signals to a variable frequency drive, wherein the control signals include voltages configured to control one or more switching devices to output a pulse width modulated (PWM) signal;
a simulator including a processing device and a memory device structured to store a set of instructions which, when executed by the processing device, are configured to simulate the variable frequency drive and the load, including:
receiving the control signals;
processing the control signals to determine first simulated operational data;
determining second simulated operational data based on a load model and the first simulated operational data;
determining feedback signals based on the first simulated operational data and the second simulated operational data; and
transmitting the feedback signals to the controller; and
a computer configured to communicate simulation parameters with the simulator;
wherein the simulator is further configured to process the simulation parameters and the control signals to simulate a DC bus voltage of the variable frequency drive and the feedback signals include the simulated DC bus voltage.

16. The system of claim 15, further comprising:
wherein the computer is configured to communicate operation commands to the controller and to receive status information from the controller, wherein the computer is further configured to communicate with the simulator to select the model to be used by the simulator.

17. The system of claim 16, wherein the computer is further configured to initiate one or more simulated fault events in the simulator.

18. The system of claim 17, wherein the feedback signals include simulated fault sensor data based on the simulated fault events.

19. The system of claim 18, wherein the controller is further configured to process the simulated fault sensor data to determine a fault condition and to adjust the control signals based on the fault condition.

20. The system of claim 19, wherein the status information includes an identification of the fault condition determined.

21. The system of claim 15, wherein the first simulated operational data comprises simulated inverter output voltages and the second simulated operational data comprises simulated output currents.

22. A method, comprising:
generating control signals, with a first computing device, to control operation of a variable frequency drive and a load;
receiving the control signals with a second computing device;
selecting, with a third computing device, a simulation mode to be used by the second computing device;
processing the control signals to determine one or more first simulated operational data with the second computing device;
processing, with the second computing device, the first simulated operational data according to the simulation mode from the third computing device and a load model to determine one or more second simulated operational data:
processing, with the second computing device, the first simulated operational data and the second simulated operational data to determine feedback signals including DC bus voltage;
transmitting the feedback signals to the first computing device; and
monitoring performance of the first computing device and the second computing device with the third computing device.

23. The method of claim 22, further comprising:
initiating a simulated fault condition in the second computing device with the third computing device; and
generating simulated fault sensor data according to the simulated fault condition, wherein the feedback signals include the simulated fault sensor data.

24. The method of claim 23, further comprising:
processing the feedback signals with the first computing device to identify the simulated fault condition; and
generate new control signals based on the simulated fault condition.

25. The method of claim 22, wherein the first simulated operational data is simulated inverter output voltages and the second simulated operational data is simulated output currents.

26. The method of claim 22, wherein the first computing device includes a digital signal processor, the second computing device is a simulator board, and the third computing device is a computer including a user interface.

* * * * *